Nov. 19, 1963  A. W. JOHNSON  3,111,180
BEAM TYPE WEIGHING SCALE
Filed April 17, 1961  2 Sheets-Sheet 1
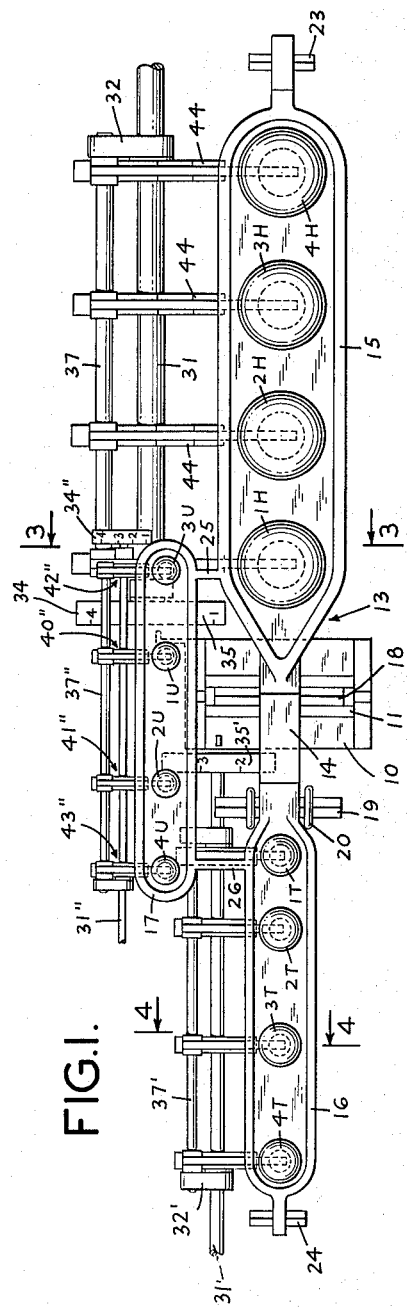
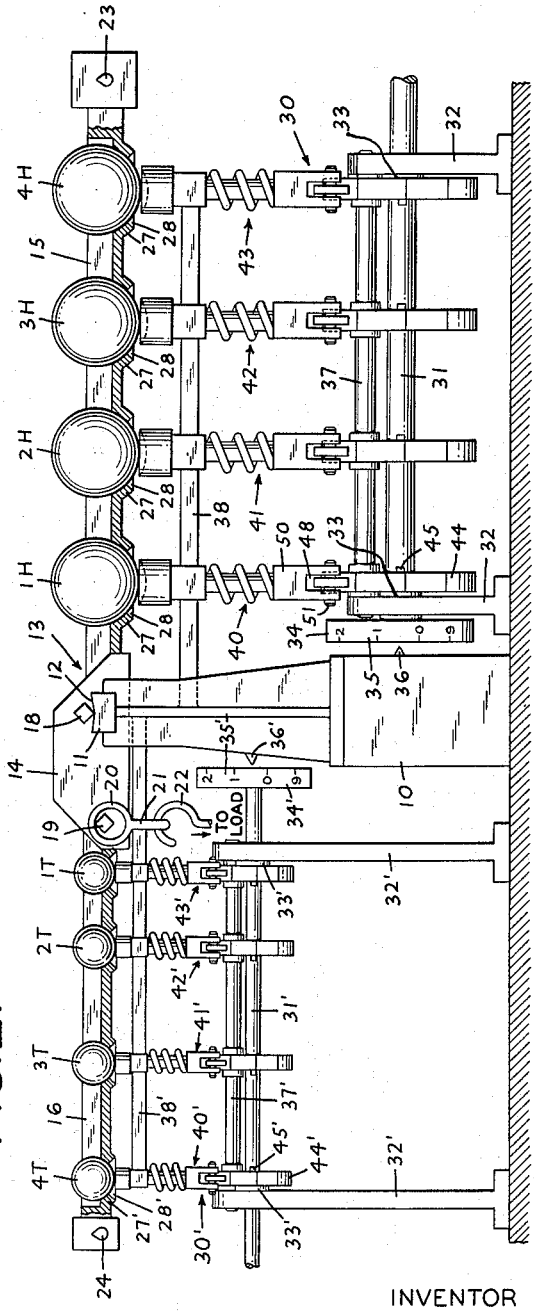
INVENTOR
AARON W. JOHNSON
BY
F. J. Pisarra
ATTORNEY Nov. 19, 1963 A. W. JOHNSON 3,111,180
BEAM TYPE WEIGHING SCALE
Filed April 17, 1961 2 Sheets-Sheet 2
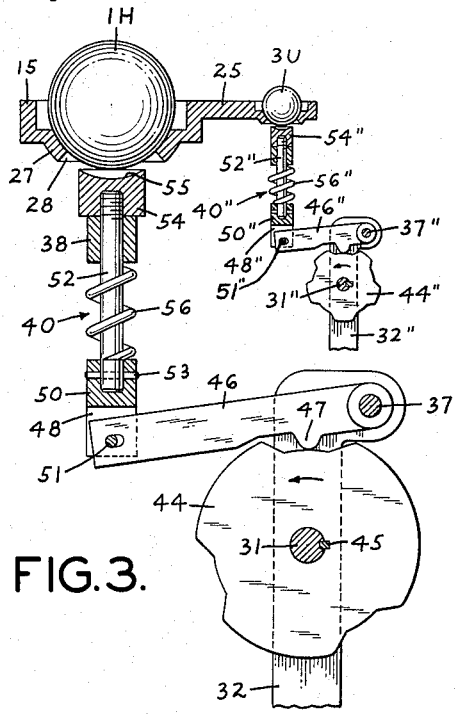
FIG.3.
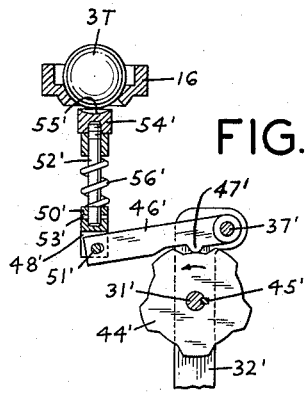
FIG.4.
FIG.5.
| VALUE | 4U | 2U | 1U | 3U |
|---|---|---|---|---|
| 0 | X | X | | |
| 1 | X | X | X | |
| 2 | X | | | |
| 3 | X | | X | |
| 4 | X | X | X | X |
| 5 | X | | | X |
| 6 | | | | |
| 7 | | | X | |
| 8 | | X | X | X |
| 9 | | | | X |
UNITS
FIG.6.
| VALUE | 4T | 3T | 2T | 1T |
|---|---|---|---|---|
| 00 | X | X | X | X |
| 10 | X | X | X | |
| 20 | X | X | | X |
| 30 | X | X | | |
| 40 | X | | X | |
| 50 | X | | | X |
| 60 | X | | | |
| 70 | | X | | |
| 80 | | | X | |
| 90 | | | | X |
TENS
FIG.7.
| VALUE | 1H | 2H | 3H | 4H |
|---|---|---|---|---|
| 000 | | | | |
| 100 | X | | | |
| 200 | | X | | |
| 300 | | | X | |
| 400 | | | | X |
| 500 | X | | | X |
| 600 | | X | | X |
| 700 | | | X | X |
| 800 | X | | X | X |
| 900 | | X | X | X |
HUNDREDS
INVENTOR
AARON W. JOHNSON
BY
*F. J. Pisarra*
ATTORNEY United States Patent Office 3,111,180
Patented Nov. 19, 1963

3,111,180
BEAM TYPE WEIGHING SCALE
Aaron W. Johnson, 21 Cox Ave., Yonkers, N.Y.
Filed Apr. 17, 1961, Ser. No. 103,428
6 Claims. (Cl. 177—248)

This invention relates to the art of weighing scales and, more particularly, to an improved beam type weighing scale having novel and simplified features of design and construction.

The weighing scale of this invention has wide application. It is especially useful for the purpose of readily and accurately weighing a single batch or successive batches of one or more materials. The number of batches and the total amount of materials to be weighed are limited only by the overall capacity of the scale. As will be evident from the detailed description appearing further along herein, the scale may be of any desired practical capacity.

The exceptional utility of my present scale is predicated on the fact that it embodies a number of interrelated and cooperative novel features. Such features include the following:

(1) My weighing scale includes a single scale beam device of new and improved construction and design. The beam device comprises a body unit and a plurality of beam units. The body unit is provided with a first bar that is fulcrumed on a support means, such as an upright standard, for pivotal or tilting movement of the beam device about a horizontal axis, and a second bar which is adapted to be coupled to a load. One of the beam units projects beyond one end of the body unit and is disposed wholly to one side of the horizontal axis. Another beam unit projects belond the other end of the body unit and is disposed wholly beyond the other side of the horizontal axis. The beam device preferably includes a third beam unit which is positioned rearwardly of the first and second beam units and extends to each side of the horizontal axis. Each beam unit is formed with a plurality of openings which are arranged in a row and are located at predetermined distances from the horizontal axis. These openings are defined by concave poise seats which are formed in each beam unit.

(2) My weighing scale utilizes ball poises. The ball poises for each beam unit are made of the same material, preferably a suitable metal, and are identical in size and weight. This results in manufacturing economies and permits the ball poises for each beam unit to be used interchangeably without adversely affecting the accuracy of the scale.

(3) The beam units and the corresponding ball poises are so constructed and arranged that the centers of gravity of all ball poises are in a common plane when seated. This insures proper relationship of the parts when seletced ball poises are in active use.

(4) My present scale construction utilizes the decimal system. Thus, to attain the ten weight values for any denomination of the decimal system, only four poises are required. In a scale having three denominations, namely units, tens and hundreds, a total of only twelve poises are required, i.e. four poises for each of the three denominations. In a scale having four denominations, namely units, tens, hundreds and thousands, a total of only sixteen poises are required, i.e. four poises for each of the four denominations. As a consequence, the number of poises needed, for any proposed number of denominations, is reduced to a minimum.

(5) A further feature of the invention resides in the utilization of improved apparatus for alternately lifting and lowering selected poises relative to corresponding beam units, whereby such poises are readily placed out of or into active service, as required. This apparatus comprises a mechanism for each beam unit, each mechanism including an arrangement of rotary cams, levers and reciprocable poise-support members which are cooperatively associated with corresponding ball poises. These mechanisms may be operated independently and manually or in unison by means of suitable automatic control equipment which may be located proximate the scale or at a place remote from the scale, as will be apparent to persons trained in the art.

The primary object of this invention is to provide a beam type weighing scale of improved and simplified construction and design.

Another object of the invention is to incorporate the above-enumerated features in a weighing scale.

The invention has for a further object the provision of a weighing scale of the character indicated that is simple and compact in design; that is sturdy and durable in construction; that is reasonable in manufacturing, installation and maintenance costs; and that is capable of performing its intended functions in an efficient, accurate and dependable manner.

The foregoing objects and other objects, together with the advantages of the invention will be readily understood by persons trained in the art from the following detailed description and the accompanying drawings which describe and illustrate a preferred embodiment of the invention.

In the drawings, wherein like reference characters denote corresponding parts throughout the several views:

FIG. 1 is a top plan view of a beam type weighing scale which is constructed according to this invention;

FIG. 2 is a front elevation view of the scale shown in FIG. 1, certain parts being shown in vertical cross section;

FIG. 3 is a view in enlargement taken along line 3—3 of FIG. 1;

FIG. 4 is a view in enlargement taken along line 4—4 of FIG. 1; and

FIGS. 5, 6 and 7 are tables identifying the ball poises shown in other views and indicating which of such poises are placed in active service to obtain selected weighing values.

The illustrated form of the invention comprises support means including a vertical standard or post 10 which has a transverse bearing member 11 at its upper end. The bearing member is provided with a relatively shallow V-shaped recess 12 and serves as the fulcrum for a scale beam device 13.

Beam device 13 may be of one-piece or multi-piece construction, as desired. This device comprises a body unit 14 and a plurality of beam units 15, 16 and 17. Body unit 14 is equipped with a pair of spaced, lateral and parallel bars 18 and 19. Bar 18 registers with recess 12 and thus permits pivotal or tilting movement of the beam device relative to standard 10 about a horizontal axis, as will be evident from an examination of FIGS. 1 and 2. Bar 19 extends through eye elements 20 at the ends of a generally U-shaped connector 21. A hook element 22 engages connector 21 and is adapted to be connected to a load (not shown). Both bars 18 and 19 are preferably removable to facilitate manufacture and assembly and to allow for ready replacement, as may be required due to wear.

Beam units 15 and 16 are aligned and disposed to opposite ends of the body unit and are provided at their free ends with corresponding arms 23 and 24, respectively, for attachment of dead weights whereby the scale may be initially balanced. Beam unit 17 is positioned rearwardly of the body member and beam units 15 and 16 and is connected to unit 15 by an arm 25 and to unit 16 by an arm 26 (FIGS. 1 and 3). Each of the beam units has the general configuration of a trough to insure retention thereon of corresponding ball poises which will be described further along herein.

Beam unit 15 is provided with a plurality of, preferably four, longitudinally spaced concave poise seats 27, each of which defines a circular opening 28. Associated with each seat is corresponding ball poise 1H, 2H, 3H and 4H, each of which represents a weight value of one hundred units. These poises are made of a suitable material, preferably metal, and are substantially spherical and identical in size and weight to the end that they may be used interchangeably. The distance between each ball poise and the next adjacent ball poise is equal to the distance between any selected successive pair of poises when the poises are positioned in their seats, as shown in FIG. 2.

The weighing scale of this invention includes a mechanism 30 for selectively placing ball poises 1H, 2H, 3H and 4H into and out of active service. Mechanism 30 is best shown in FIGS. 1, 2 and 3 and includes a horizontal rotary shaft 31 which is mounted for rotation on a pair of upstanding supports 32. The shaft is provided with a pair of collars 33 adjacent corresponding supports 32 to prevent axial movement of the shaft. A hand wheel 34 is attached to one end of shaft 31 and is provided with a scale 35 consisting of circumferentially spaced, peripheral graduations, ranging from "0" through "9." An indicator pointer 36, which is carried by standard 10, cooperates with the hand wheel graduations to indicate the angular position of the shaft and parts carried thereby. A second horizontal shaft 37 is positioned behind and above shaft 31, as illustrated in FIG. 3. This shaft is stationary. An arm 38 is attached to and projects laterally of standard 10. This arm is parallel to shafts 31 and 37.

Mechanism 30 also includes a plurality of separate lifting devices, namely devices 40, 41, 42 and 43 for effecting raising or lowering of ball poises 1H, 2H, 3H and 4H, respectively, relative to beam device 15. Device 40 comprises a cam disc 44 that is affixed to shaft 31 by a key 45 and a cam lever 46 having a projection 47. One end of the lever is freely rotatable about shaft 37. The other end of the lever registers with a slot 48 in a bifurcated coupler 50 and is pivotally connected thereto by a pin 51. A cylindrical rod 52 is slidable in an opening in arm 38. The lower end of rod 52 is connected to coupler 50 by a pin 53. The upper end of the rod is threaded and engages a tap in the lower end of a poise-support member 54. Member 54 is aligned with an opening 28 and ball poise 1H and is smaller in diameter than the opening. Member 54 is concave, as indicated at 55, and conforms to a portion of the surface of ball poise 1H whereby that poise is adapted to be engaged and raised above its seat in response to predetermined upward movement of rod 52. A helical compression spring 56 is coaxial with rod 52 and bears at its ends against coupler 50 and arm 38. This spring serves two functions: (1) it normally and yieldingly biases rod 52 and poise-support member 54 downwardly and (2) it yieldingly maintains lever projection 47 in contact with the periphery of cam disc 44.

Lifting devices 41, 42 and 43 are identical with device 40 except as to the angular position of corresponding cam discs. It will be appreciated that all of the cam discs are arranged for rotation in unison.

Beam unit 16 is smaller than beam unit 15 but is basically the same in construction and configuration as beam unit 15. The parts of beam unit 16 and its associated devices which correspond to like parts of beam unit 15 and its associated devices are denoted by corresponding primed reference numerals which are further identified in the following listing:

| Reference numerals: | Parts |
|---|---|
| 27' | poise seats. |
| 28' | circular openings. |
| 30' | mechanism. |
| 31' | rotary shaft. |
| 32' | supports. |
| 33' | collars. |
| 34' | hand wheel. |
| 35' | scale. |
| 36' | indicator pointer. |
| 37' | stationary shaft. |
| 38' | support arm. |
| 40' | lifting device. |
| 41' | lifting device. |
| 42' | lifting device. |
| 43' | lifting device. |
| 44' | cam disc. |
| 45' | key. |
| 46' | lever. |
| 47' | lever projection. |
| 48' | slot. |
| 50' | coupler. |
| 51' | pin. |
| 52' | rod. |
| 53' | pivot pin. |
| 54' | poise-support member. |
| 55' | concave surface. |
| 56' | compression spring. |

Associated with each seat 27' is a corresponding ball poise 1T, 2T, 3T and 4T. Each of these ball poises represents a weight value of ten units. As in the case of earlier described ball poises, poises 1T through 4T are preferably made of a suitable metal and are substantially spherical and substantially identical in size and weight.

Beam unit 17 is similar to beam units 15 and 16. This beam unit is adapted to carry ball poises 1U, 2U, 3U and 4U which correspond in number, composition, configuration and function to ball poises 1H through 4H and 1T through 4T. Each of ball poises 1U through 4U represents a weight value of one unit.

Cooperatively associated with ball poises 1U through 4U are several shafts, cam discs, levers, springs and other elements which are similar to like parts described above. To the extent that they are illustrated in FIGS. 1 and 3, such parts are designated by reference characters appearing earlier herein but distinguished therefrom in that they are double primed. The referred-to parts are further identified in the following listing:

| Reference numerals: | Parts |
|---|---|
| 31" | rotary shaft. |
| 32" | supports. |
| 34" | hand wheel. |
| 37" | stationary shaft. |
| 40" | lifting device. |
| 41" | lifting device. |
| 42" | lifting device. |
| 43" | lifting device. |
| 44" | cam disc. |
| 46" | lever. |
| 50" | coupler. |
| 51" | pivot pin. |
| 52" | rod. |
| 54" | poise-support member. |
| 56" | compression spring. |

Reference is next had to the tables of FIGS. 5, 6 and 7. These tables indicate which of the poises are placed in active service, i.e. remain seated, and which of the poises are placed out of active service, i.e. are raised or lifted by corresponding mechanisms above their beam units, in setting the scale for a predetermined load. Let us assume, for example, that the scale is to be set to weigh a load of 538 units, such as pounds. Hand wheel 34 is turned to position "5." Cam discs 44 are so configured and arranged on shaft 31 that, with the hand wheel at position "5," ball poises 1H and 4H remain seated while ball poises 2H and 3H are lifted above their seats. See Table 7 under "value 500." Hand wheel 34' is turned to position "3." The parts associated with shaft 31' are actuated in a manner that ball poises 3T and 4T remain seated while ball poises 1T and 2T are lifted above their seats. See FIG. 6 under "value 30." Hand wheel 34" is turned to position "8." This operates the devices associated with hand wheel 34" in a manner that ball poises 1U, 2U and 3U remain seated while ball poise 4U is lifted above its seat. See FIG. 5 under "value 8."

From the foregoing, it is believed that the construction, operation, objects and advantages of my present invention will be readily comprehended by persons skilled in the art, without further description. It is to be clearly understood, however, that various changes in the construction described above and illustrated in the drawings may be made without departing from the scope of the invention, it being intended that all matter contained in the description or shown in the drawings shall be interpreted as illustrative only and not in a limiting sense.

I claim:

1. In a weighing scale of the character described, support means, a scale beam device carried by and tiltable relative to the support means about a generally horizontal axis, said beam device comprising a body unit engaged by the support means and adapted to be connected to a load, a plurality of beam units secured to the body unit, one of the beam units projecting beyond one end of the body unit and disposed wholly to one side of said axis, another of the beam units projecting beyond the other end of the body unit and disposed wholly to the other side of said axis, each of the beam units being provided with a plurality of spaced openings arranged in a row and at predetermined distances from said axis, a plurality of ball poises for each beam unit, the ball poises of each beam unit being substantially identical in size and weight, the size and weight of each ball poise of one beam unit differing from those of the other beam unit, each of the ball poises being removably seated on a portion of each beam unit which defines a corresponding one of said openings, and means for lifting preselected ball poises from their seats along a substantially vertical path and maintaining the same out of engagement with the beam device.

2. In a weighing scale of the character described, support means, a scale beam device carried by and tiltable relative to the support means about a generally horizontal axis, said beam device comprising a body unit engaged by the support means and adapted to be connected to a load, a plurality of beam units secured to the body unit, one of the beam units projecting beyond one end of the body unit and disposed wholly to one side of said axis, another of the beam units projecting beyond the other end of the body unit and disposed wholly to the other side of said axis, each of the beam units being provided with a plurality of spaced openings arranged in a row and at predetermined distances from said axis, a plurality of ball poises for each beam unit, the ball poises for each beam unit being substantially indentical in size and weight, the size and weight of each ball poise of one beam unit differing from those of the other beam unit each of the ball poises being removably seated on a portion of each beam unit which defines a corresponding one of said openings, the centers of gravity of all of the ball poises lying substantially in a common plane, and means for lifting preselected ball poises from their seats along a substantially vertical path and maintaining the same out of engagement with the beam device.

3. A weighing scale according to claim 2 including a load-carrying unit connected to and pivotal relative to the device about an axis that is intermediate the first-mentioned axis and the opening in one of the beam units which is next adjacent the first-mentioned axis.

4. In a weighing scale of the character described, support means, a scale beam device carried by and tiltable relative to the support means about a generally horizontal axis, said beam device comprising a plurality of beam units, each of the beam units being provided with a plurality of spaced openings arranged in a row and at predetermined distances from said axis, a plurality of poises for each unit, each of the poises being removably seated on a portion of each beam unit which defines a corresponding one of said openings, and means for removing preselected poises from their seats and maintaining the same out of engagement with the beam device, said last-mentioned means comprising a mechanism for each of the beam units, each mechanism including a plurality of camming means, a plurality of poise-lifting members each of which is reciprocable along a generally vertical path and is associated with a corresponding poise, and means responsive to actuation of each camming means for imparting movement to a corresponding poise-lifting member along said path.

5. In a weighing scale of the character described, support means, a scale beam device carried by and tiltable relative to the support means about a generally horizontal axis, said beam device comprising a plurality of beam units, each of the beam units being provided with a plurality of spaced openings arranged in a row and at predetermined distances from said axis, a plurality of ball poises for each beam unit, each of the ball poises being removably seated on a portion of each beam unit which defines a corresponding one of said openings, and means for removing preselected ball poises from their seats and maintaining the same out of engagement with the beam device, said last-mentioned means comprising a mechanism for each beam unit, each mechanism including a rotary shaft, a plurality of cams secured to and rotatable with the shaft, a plurality of poise-support members each of which is reciprocable along a generally vertical path and is associated with a corresponding ball poise, and means responsive to angular movement of each cam about the axis of the shaft for imparting movement to a corresponding poise-support member along said path, said last-recited means including resilient means normally and yieldingly urging each poise-support member in a direction away from a corresponding ball poise along said path.

6. In a weighing scale of the character described, support means, a scale beam device carried by and tiltable relative to the support means about a generally horizontal axis, said beam device comprising a plurality of beam units, each of the beam units being provided with a plurality of spaced openings arranged in a row and at predetermined distances from said axis, a plurality of ball poises for each beam unit, the ball poises for each beam unit being substantially identical in size and weight, each of the ball poises being removably seated on a portion of each beam unit which defines a corresponding one of said openings, the centers of gravity of all of the ball poises lying substantially in a common plane when the poises are seated, and means for removing preselected ball poises from their seats and maintaining the same out of engagement with the beam device, said last-mentioned means comprising a mechanism for each beam unit, each mechanism including a rotary shaft, a plurality of cams secured to and rotatable with the shaft, a plurality of poise-support members each of which is reciprocable along a generally vertical path and is associated with a corresponding ball-poise, and means responsive to angular movement of each cam about the axis of the shaft for imparting movement to a corresponding poise-support member along said path, said last-recited means including resilient means normally and yieldingly urging each poise-support member in a direction away from a corresponding ball poise along said path.

References Cited in the file of this patent

UNITED STATES PATENTS

| | | |
|---|---|---|
| 99,148 | Buoy | Jan. 25, 1870 |
| 1,624,588 | Essmann | Apr. 12, 1927 |
| 2,716,546 | Stelzer | Aug. 30, 1955 |

FOREIGN PATENTS

| | | |
|---|---|---|
| 332,386 | Great Britain | July 24, 1930 |